United States Patent [19]

Salathiel et al.

[11] 4,233,165
[45] Nov. 11, 1980

[54] WELL TREATMENT WITH EMULSION DISPERSIONS

[75] Inventors: William M. Salathiel; Thomas W. Muecke; Claude E. Cooke, Jr., all of Houston, Tex.; Norman N. Li, Edison, N.J.

[73] Assignee: Exxon Production Research Company, Houston, Tex.

[21] Appl. No.: 909,139

[22] Filed: May 24, 1978

[51] Int. Cl.³ .................................................. C09K 3/00
[52] U.S. Cl. ........................... 252/8.55 R; 252/8.55 C; 252/8.5 P; 166/305 R; 166/308; 166/271
[58] Field of Search ............... 252/8.55 R, 8.55 C, 252/8.5 P, 312; 166/305 R, 307, 308, 271, 275, 281, 282, 283, 280

[56] References Cited

U.S. PATENT DOCUMENTS

| | | | |
|---|---|---|---|
| 3,710,865 | 1/1973 | Kiel | 252/8.55 R |
| 3,799,266 | 3/1974 | Kiel | 252/8.55 C |
| 3,977,472 | 8/1976 | Graham et al. | 252/8.55 R |

Primary Examiner—Benjamin R. Padgett
Assistant Examiner—J. L. Barr
Attorney, Agent, or Firm—Robert B. Martin

[57] ABSTRACT

A method of treating a subterranean formation wherein a well treatment composition comprising a dispersion of a water-in-oil emulsion in an aqueous medium is injected into the formation. The water-in-oil emulsion has an internal aqueous phase and an external phase containing a liquid hydrocarbon and a surfactant soluble in the hydrocarbon. The compositions can be designed to perform various well treatment applications including hydraulic fracturing and acidizing and can also be used to encapsulate or transport well treatment materials and chemicals into the wellbore or formation.

34 Claims, 6 Drawing Figures

WELL TREATMENT WITH EMULSION DISPERSIONS

BACKGROUND OF THE INVENTION

1. Field of the Invention

This invention relates to the treatment of formations surrounding oil wells, gas wells, injection wells and similar boreholes by the injection of a treatment fluid. In certain aspects it relates to acidizing, fracturing, or plugging the formation that is being treated.

2. Description of the Prior Art

Many techniques can be broadly described as well treatment techniques. Basically, all well treatments involve the injection of a fluid into an oil or gas well to either stimulate production from the well or to impart certain desired properties to the formation surrounding the well. Probably, the most widely used stimulation technique is hydraulic fracturing where a fracturing fluid is injected into a well under pressure to propagate a fracture adjacent the well. Another widely used stimulation technique is acidizing in which an acidic fluid is introduced into the formation to dissolve formation rock. One acidizing method is known as matrix acidizing whereby an acid is injected into the formation to etch into the pore spaces and fissures naturally present in the formation. Acidizing can also be used in conjunction with hydraulic fracturing whereby the acid reacts on the conductive channels formed by the fracturing operation.

Occasionally, well treatments are designed to achieve the opposite of stimulation; namely, plugging or sealing off a formation to prevent or inhibit the flow of fluids. For example, if a certain zone within an oil or gas formation is producing undesirable quantities of water or brine, it may be necessary to plug the zone by introducing a well treatment fluid carrying a plugging agent which will effectively seal off flow from the zone. In some instances it is desirable to temporarily plug off a zone of a formation so that a following well treatment such as acidizing, can be selectively diverted into another zone of the formation. When the follow-up well treatment is completed, the temporary plugging materials are removed to restore flow to the zone.

For each of the well treatment methods described above, well treatment fluids of various compositions have been designed to enhance the results of the particular treatment. For example, a fracturing fluid should have a sufficiently high viscosity in order to propagate a wide and long fracture in a formation and to transport a large quantity of proppant into the fractures. Currently, oil-in-water emulsions are widely-used, high viscosity, fracturing fluids which contain a major proportion of an oil internal phase dispersed in a minor proportion of a water external phase. Recent developments in the fracturing fluid art pertaining to stabilized oil-in-water emulsions are described in U.S. Pat. Nos. 3,710,865 (Kiel) and 3,977,472 (Graham et al). However, one disadvantage of most oil-in-water emulsion fracturing fluids is that they contain large quantities of oil. As oil prices continue to escalate, the cost of the oil internal emulsions proportionately increases. Simply lowering the concentration of the oil phase is not an acceptable approach since this produces a fluid having insufficient viscosity unless large quantities of polymers are added to the aqueous phase.

With regard to acidizing, treating fluids are preferably designed to achieve delayed acidization. In an acid fracturing treatment, the acid should not attack wellbore tubulars or be rapidly consumed in the area of the formation immediately adjacent the wellbore. Instead, the acid should penetrate deep into the formation where it can achieve a high degree of well stimulation. In a matrix acidization of a carbonate formation, it is undesirable to have a fluid which will promote the formation of wormholes which are short and wide and which do not penetrate deeply into the formation. Instead it is desirable to have long and narrow wormholes which enter the least porous channels where stimulation is necessary. For both acid fracturing and matrix acidizing of carbonate formations, oil internal—acid external emulsions are frequently used to achieve the necessary penetration of acid into the formation. Such emulsion systems are more fully described in U.S. Pat. No. 3,799,266 (Kiel). However, the acid external system has the previously-mentioned disadvantage of containing a high percentage of an expensive oil phase.

Oil-in-water emulsions have also been used as the treating fluids in other types of well treatments such as formation plugging. An oil-in-water emulsion, because of its high viscosity will, by itself, tend to seal off a formation until it is subsequently broken. Secondly, the emulsion serves as an excellent carrier fluid for particulate materials such as diverting and plugging agents. However, once again the logical selection of a highly viscous oil-in-water emulsion is hampered by cost considerations which must account for the expense of using a high percentage oil emulsion.

One approach to overcoming the increasing cost of oil in emulsions used for hydraulic fracturing, acidizing and other well treatment applications, has been to use oil external emulsions. Oil external emulsions generally contain only about 10 to 30 volume percent oil as opposed to the 60 to 80 volume percent typically present in oil internal emulsions. However, the major disadvantage of oil external emulsions which severely limits their use is the increased frictional resistance to flow down well tubulars. U.S. Pat. No. 3,378,074 (Kiel) discloses a technique whereby a lubricating ring of water is used to surround a viscous fracturing fluid, such as an oil external emulsion, as it enters the wellhead. The water ring forms a physical barrier which prevents the viscous fluid from contacting the well tubulars, thereby lowering the friction pressure drop considerably. However, this technique may require the use of special wellhead equipment and fittings to create the conditions necessary to form a film of water between the viscous emulsion and the tubular wall.

SUMMARY OF THE INVENTION

The present invention provides an improved well treatment method employing a dispersion of a water-in-oil emulsion in an aqueous medium. The emulsion comprises an internal aqueous phase and an external hydrocarbon phase containing a liquid hydrocarbon and a surfactant soluble in the hydrocarbon. For most well treatments, the water-in-oil emulsion dispersed in the aqueous medium should comprise from about 30 to about 95 volume percent of the well treatment composition, with a more preferable range being between about 60 and 80 volume percent.

The water-in-oil emulsion is prepared by vigorously mixing a liquid hydrocarbon-surfactant blend with an aqueous fluid to form a stable, fine-grained emulsion. The hydrocarbon-surfactant blend contains soluble surfactant, the surfactant concentration generally being in the range of 0.5 to 40 weight percent and preferably 3.0 to 25 weight percent. The mixing operation for the emulsion should be designed to form an emulsion having internal aqueous droplets with an average diameter of from about 0.01 to about 100 microns and preferably from about 0.1 to about 10 microns. The external oil phase comprising the hydrocarbon-surfactant blend should amount to from about 3 to about 50 percent of the total volume of the emulsion and preferably from about 5 to 25 percent. Once a stabilized emulsion is prepared, it is dispersed in an aqueous suspending medium to form the well treatment fluid used in the present invention. Since the overall oil phase concentration in the dispersion will generally be less than about 25 percent, the well treatment compositions used in the present invention are much lower in cost than conventional oil-in-water emulsions having significantly higher oil contents.

The well treatment compositions of the present invention can be used in hydraulic fracturing and acidizing operations as well as numerous other well treatment techniques. In a hydraulic fracturing operation, the water-in-oil emulsion is uniformly blended into an external aqueous medium to form a fracturing fluid. The fracturing fluid is then injected into a subterranean formation at sufficient pressure to fracture the formation. Viscosifiers and other chemicals may be added to the external aqueous phase to increase the viscosity of the fracturing fluid to delay the onset of turbulence and to stabilize the dispersion of the emulsion in the aqueous phase. For acidizing operations, acid may be added to the external aqueous phase or to the internal aqueous droplets of the emulsion. If added to the internal aqueous droplets, the acid will not be released until the droplets break apart upon entering the smaller pore spaces found deep in the formation. Well treatment fluids such as contaminant scavengers, can also be dissolved in the aqueous droplets. Well contaminants soluble in the external aqueous medium can permeate through the external oil phase of the emulsion and react with the contaminant scavenger entrained in the aqueous droplets of the emulsion. The aqueous droplets can also serve to encapsulate particulate matter such as plugging particles used for well diversion treatments.

DESCRIPTION OF THE PREFERRED EMBODIMENT

Figure 1:
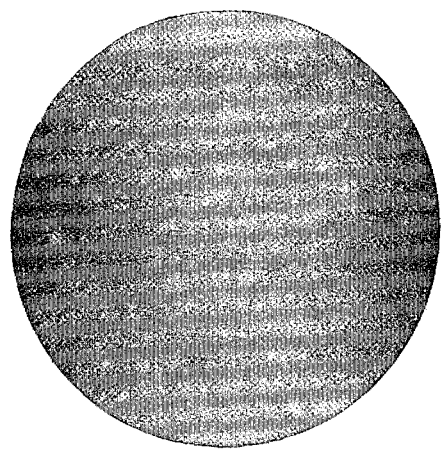
FIG. 1 is a photomicrograph of a water-in-oil emulsion used in the preparation of a well treatment fluid useful in the present invention.

The well treatment compositions useful for the purposes of the present invention comprise a dispersion of a water-in-oil emulsion in an aqueous medium. The emulsion has an internal aqueous and an external oil phase comprising a blend of a liquid hydrocarbon and an oil soluble surfactant.

The well treatment compositions can be made by a basic three-step approach. The first step is to form a liquid oil-surfactant mixture by blending a suitable liquid hydrocarbon with a compatible surfactant. The liquid hydrocarbon selected can be a crude oil or a refined petroleum fraction such as diesel oil, gas condensate, gas oil, kerosene, gasoline, and the like. Particular hydrocarbons, such as benzene, toluene, ethylbenzene, cyclohexane, hexane, decane, hexadecane and the like can also be used. Crude oil, however, is normally preferred because it is usually readily available at a well site and compatible with hydrocarbon-bearing formations. However, if crude oil is unavailable, then hydrocarbon liquids which have a viscosity less than about 10 centipoises at formation temperatures (e.g., diesel oil) are preferred.

The liquid hydrocarbon can be blended with a wide variety of different oil soluble surfactants. Surfactants useful in forming a compatible mixture with liquid hydrocarbons include anionic, cationic and nonionic surfactants. Suitable anionic surfactants include fatty acid soaps which are the salts of long chain fatty acids derived from naturally occurring fats and oils and salts of alkylbenzene sulfonic acids. A preferred anionic surfactant is the morpholinium salt of tetracosanylbenzene sulfonic acid. The ammonium and alkali metal salts are also suitable. Cationic surfactants include amine salts such as polyoxyethylene amine as well as quaternary ammonium compounds. Particularly useful cationic surfactants include high molecular weight alkyl imides and amides of polybasic amines. A highly preferred cationic surfactant of this type is sold under the tradename ECA 4360 by Exxon Chemical Company. Another useful surfactant is an amine surfactant manufactured under the tradename ENJ 3029 by Exxon Chemical Company. Suitable nonionic surfactants include derivatives of glycerides, glucosides, polyoxyethylene and polyoxypropylene. Typical nonionic surfactants include ethoxylated linear alcohols and ethoxylated alkyl phenols. A preferred nonionic surfactant is a sorbitan fatty acid sold under the tradename Span 80 by Atlas ICI. Mixtures of surfactants can also be used. For example, mixtures of Span 80 and ECA 4360 are particularly suited to forming stable, strong water-in-oil emulsions.

Typically, minor amounts of surfactant are blended with a liquid hydrocarbon to form the liquid oil-surfactant mixture. Surfactant concentration may be in the range of about 0.5% to about 40% by weight of the surfactant-hydrocarbon mixture. However, it is preferred that the surfactant concentration be about 3% to about 25% by weight.

The second step in forming the well treatment composition is to make a water-in-oil emulsion which is preferably a very fine grained emulsion having an internal aqueous phase and an external surfactant-bearing, hydrocarbon phase. Minimizing the size of the internal phase water droplets increases the stability of the emulsion. Small aqueous droplets can be prepared by thoroughly emulsifying the aqueous and hydrocarbon phases. Preferably, emulsification is accomplished by slowly pouring the aqueous component into the surfactant-hydrocarbon blend while intensive blending is applied. The mixture should be vigorously stirred or sheared for about 5 to 20 minutes, the rate of shear being highly dependent on the size and type of mixing device employed. In oil field operations, mechanical mixing equipment or blenders may be used to impart the desired shear to the mixture. Stirring rates and times should be designed to form small aqueous droplets having a diameter of from about 0.01 to about 100 microns and preferably from about 0.1 to about 10 microns. The fine grained emulsion should contain from about 3 to about 40 volume percent of the liquid hydrocarbon phase; the preferred concentration being about 5 to about 25 volume percent.

The third and final step in preparing the well treatment composition is to disperse the water-in-oil emulsion in an aqueous medium. This is achieved by a simple mixing operation in which the stabilized emulsion is gently contacted with the aqueous medium. Some agitation may be necessary to adequately disperse the emulsion in the aqueous medium. Preferably, the emulsion is added to the aqueous medium under conditions of shear which cause the emulsion to disperse into the aqueous medium. Initially, some of the aqueous medium addition may become incorporated into the original emulsion in drop sizes greater than 10 microns. However, as additional aqueous fluid contacts the emulsion, the capacity of the emulsion to accept more internal phase water is exceeded and the excess fluid consequently separates from the emulsion to form a continuous aqueous phase surrounding small dispersed masses of water-in-oil emulsion. Depending upon mixing conditions and numerous other factors, the masses of emulsion dispersed in the aqueous medium may vary anywhere in size from individual, microscopic droplets having an internal aqueous core coated with a thin oil membrane to coarse aggregates or globules.

Stabilizing the well treatment mixture may be necessary so as to avoid premature separation of the dispersed emulsion from the aqueous medium. This is especially so when the dispersed emulsion globule size is quite small. Stabilization can be accomplished by several techniques, one of which is to control the ratio of emulsion to aqueous medium so that the emulsion comprises a major proportion of the mixture. Preferably, the emulsion should comprise from about 30 to about 95 volume percent of the mixture and more preferably from about 65 to about 80 volume percent. However, for matrix acidization the preferred range may be from about 30 to about 50 volume percent. Since the liquid hydrocarbon concentration of the emulsion is about 5 to 40 percent, the overall hydrocarbon concentration for the well treatment mixture will normally be between about 3 and 40 volume percent.

Density control of the emulsion and aqueous medium also enhances stabilization of the mixture. It is desirable to maintain the density of the emulsion and aqueous medium at approximately the same level so as to minimize gravitational separation forces. This can be accomplished by careful selection of the hydrocarbon phase and by addition of weighting agents to the internal aqueous phase of the emulsion. For example, the addition of minor amounts of soluble salts such as sodium or potassium chloride to the internal aqueous phase will serve to equalize the densities of the dispersed emulsion phase and the external aqueous phase. Likewise, the use of moderate density middle distillates (e.g., diesel oil) for the hydrocarbon phase of the emulsion will enhance the compatibility of the emulsion with the aqueous medium.

Stabilization of the mixture can also be improved by the addition of minor amounts of a viscosifier such as polyacrylamide, polyoxyethylene or polyvinylyrrolidone to the aqueous medium. Viscosifiers are chosen so as to have minimal interaction with the surfactants present. Increasing the viscosity of the aqueous medium increases the viscous drag on the dispersed emulsion globules and inhibits their separation from the mixture.

Small amounts of water soluble surfactants may also be added to the aqueous medium to enhance the stability of the mixture. For example, water soluble surfactants can be added to the aqueous medium in minor quantities of from about 0.01 to 5.0% by weight and preferably about 0.1%. A suitable water soluble surfactant is Tween 80 which is available from Atlas ICI. However, caution must be exercised in selecting and using a surfactant in the aqueous medium to stabilize the mixture. The use of excessive quantities of a water soluble surfactant in combination with high stirring rates can result in destruction of the original emulsion by inversion.

An important feature of the well treatment composition useful in the present invention is that it exhibits some of the favorable physical characteristics of an oil-in-water emulsion yet does not have the high oil concentration associated with oil-in-water emulsions. The reason for this is that the dispersed masses or globules of emulsion have the external appearance of pure oil droplets since the globules have an external oil phase. Thus the aqueous medium in which the emulsion is dispersed is only in contact with the external hydrocarbon phase of the emulsion and does not contact or interact with the inner aqueous droplets. Thus the aqueous medium interacts with the emulsion masses or globules in much the same manner as if they consisted entirely of oil. If the mixture is well dispersed it should behave similarly to an oil-in-water emulsion.

EXAMPLE 1

A well treatment composition was prepared by finely dispersing a water-in-oil emulsion in an aqeuous solution. The water-in-oil emulsion was prepared by first blending together No. 2 diesel oil and ENJ 3029 in a ratio of 3:1 to form a hydrocarbon-surfactant mixture. An aqueous saline solution having 2 weight % NaCl was then slowly and continuously added to the hydrocarbon-surfactant mixture while vigorous shearing was applied until the volumetric water to oil ratio was about 9:1. Vigorous mixing in a Waring blender was maintained at 3000 r.p.m. for 30 minutes to form a stable, fine grained water-in-oil emulsion. A photomicrograph at 625 magnification of the water-in-oil emulsion is shown in FIG. 1. The average size of the internal phase water droplets was about 2.25$\mu$ while the largest droplets were almost 14$\mu$.

Figure 2:
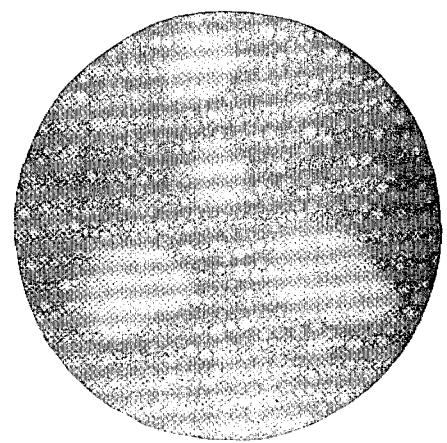
FIG. 2 is a photomicrograph of a water-in-oil emulsion containing excess water before it has interconnected to form the well treatment fluid illustrated in FIG. 3.
Figure 3:
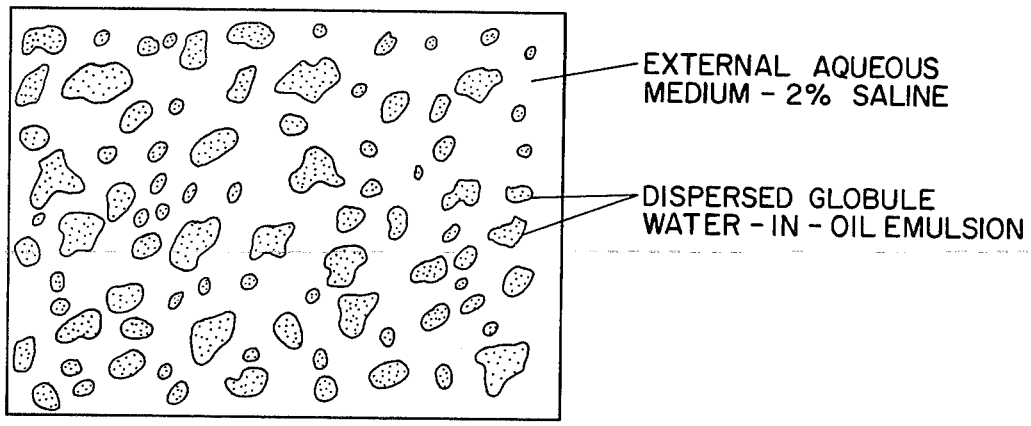
FIG. 3 is a drawing schematically depicting a well treatment fluid useful in the present invention.

After the emulsion was prepared, an additional four parts by volume of the 2% saline solution was gently mixed into the emulsion. Some of the aqueous solution initially added to the emulsion continued emulsifying and increased the droplet size of the aqueous phase in the emulsion. However, most of the excess saline water added did not emulsify and instead remained externally separate from the original emulsion. FIG. 2 is a photomicrograph at 625 magnification of the emulsion after the second water addition. As shown in the photomicrograph, most of the internal water phase droplets are in the 10μ to 15μ size range. However, a few of the droplets are in the 50μ to 150μ range, representing water which was not completely assimilated into the emulsion during the second addition of water. Shear was then applied to the emulsion which caused the larger water droplets to interconnect and form a continuous external aqueous phase in which globules of water-in-oil emulsion are dispersed. The dispersion is illustrated in FIG. 3 which schematically depicts the dispersion of the emulsion globules in the external aqueous medium when constant shear is applied. The globules of emulsion generally contain the smaller droplets of water which are in the 10μ to 15μ range. The individual globules are quite coarse and generally vary in size from about ½ inch to about 4 inches. The final composition of the dispersion contained 93.8 weight % water, of which about 60 weight % was present in the dispersed water-in-oil emulsion. The diesel oil-surfactant blend amounted to only 6.2 weight % of the total composition.

EXAMPLE 2

A well treatment composition was prepared by finely dispersing a fine grained water-in-oil emulsion in an aqueous solution. Comprising the aqueous solution was a water based fluid having 1 weight % of Purifloc-C-31 and 2.5 weight % Tween 80. Purifloc-C-31 is a polyethylene-imine polymer available from Dow Chemical Company and Tween 80 is a polyoxyethylene sorbitan monooleate surfactant available from Atlas ICI.

The water-in-oil emulsion was prepared by first blending together together No. 2 Diesel oil and surfactant ENJ 3029 in a ratio of 3:1 to form a hydrocarbon-surfactant mixture. Water was slowly added to the hydrocarbon-surfactant mixture while vigorous mixing was applied by a blender until the water-to-oil ratio was about 9:1 by weight. The water-in-oil emulsion formed by the blending operation was then homogenized to form an extremely fine grained water-in-oil emulsion.

Figure 4:
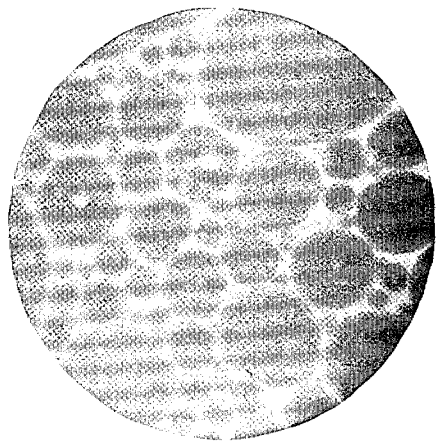
FIG. 4 is a photomicrograph of water-in-oil emulsion globules dispersed in an aqueous solution.

The water-in-oil emulsion was then finely dispersed in the aqueous solution by slowly adding the emulsion to the aqueous solution until the ratio of emulsion to solution was about 2.33 to 1. The emulsion was blended into the aqueous solution with increasing shear until the emulsion was dispersed into very small globules, most of the globules being between about 20 and 50μ. FIG. 4 is a photomicrograph at 625 magnification showing an enlargement of the globules dispersed in the aqueous solution. Within each of the emulsion globules can be seen tiny droplets of water most of which are between 0.5 and 10μ in size. Because the emulsion globules prepared in this case were so minute the dispersion of the emulsion had the appearance of an oil-in-water emulsion. In fact, only gross magnification as in FIG. 4 reveals the droplets of the internal water phase in the dispersed emulsion globules.

Tests were conducted to compare the rheological properties of the emulsion dispersions described in Examples 1 and 2 with conventional well treatment fluids known in the art. With specific reference to FIG. 5, the relationship between viscosity and shear rate at 200° F. is shown for three different fluids labeled $D_1$, $W_1$ and $P_1$. Fluid $D_1$ is the emulsion dispersion described in Example 1 to which minor amounts of a fluid loss additive and silica flour have been added. Fluid $W_1$ is the base water-in-oil emulsion from which the emulsion dispersion $D_1$ was prepared and is typical of water-in-oil emulsions used for well treatment applications such as hydraulic fracturing. Fluid $P_1$ is a polymerically thickened oil-in-water emulsion which has been extensively used for hydraulic fracturing. It has a volumetric oil to water ratio of about 2:1 and contains about 0.3% guar gum as a thickening agent in the internal aqueous phase. Emulsion $P_1$ also contains minor amounts of a fluid loss additive and silica flour.

Figure 5:
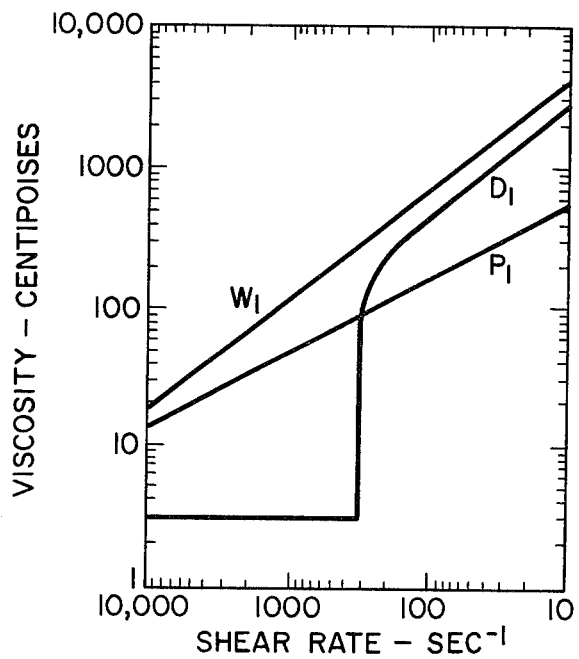
FIG. 5 is a plot of viscosity versus shear rate for a well treatment fluid useful in the present invention in comparison with two emulsions conventionally employed in the well treatment arts.

The plot in FIG. 5 shows the variation of viscosity for fluids $D_1$, $W_1$ and $P_1$ as shear is decreased from 10,000 reciprocal seconds to about 10 reciprocal seconds. High shear rates are representative of what a well treatment fluid encounters as it is pumped down tubulars into a wellbore. When the fluid enters the formation surrounding the wellbore, the shear rate drops off considerably. Thus the decline in shear rates shown in FIG. 5 would be typical of what a well treatment fluid would encounter in a treatment operation such as a hydraulic fracturing treatment of either the propped or acidized type.

At low shear rates, all three well treatment fluids exhibit relatively high viscosities. This is desirable within a growing fracture since high fluid viscosities result in low fluid losses to the formation and for purposes such as hydraulic fracturing, high viscosity fluids generate wider, longer fractures and can transport greater quantities of proppants and other particulates than can low viscosity fluids. However, at high shear rates high viscosity is disadvantageous because it results in high friction losses in the tubular goods during pumping operations. At high shear rates (above about 300 reciprocal seconds) fluid $D_1$ exhibits significantly lower viscosity than fluids $P_1$ or $W_1$. Thus the rheology of fluid $D_1$ favors its use for many well treatment applications where low friction losses are essential and where low oil content is economically desirable.

Figure 6:
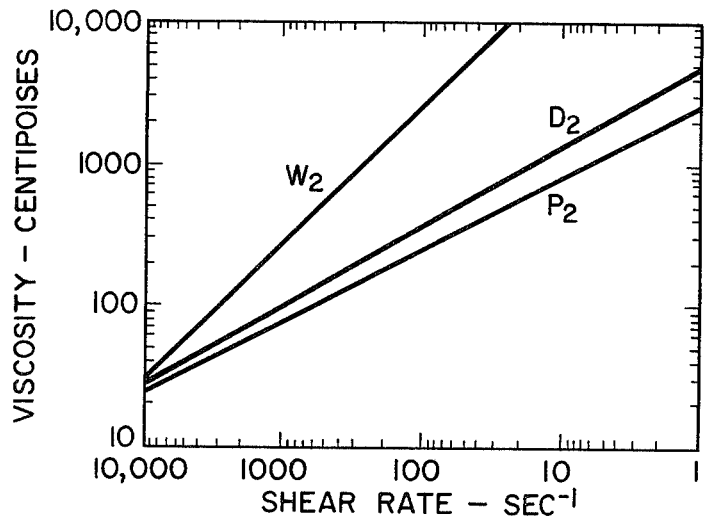
FIG. 6 is a plot of viscosity versus shear rate for another well treatment fluid useful in the present invention in comparison with two emulsions conventionally employed in the well treatment arts.

FIG. 6 is a plot, similar to the one of FIG. 5, which shows the relationship between viscosity and shear rate at 70° F. for well treatment fluids labeled as $D_2$, $W_2$ and $P_2$. As was the case with regard to FIG. 5, $W_2$ is a water-in-oil emulsion and $P_2$ is a polymerically thickened oil-in-water emulsion. Fluid $D_2$ is the dispersed emulsion fluid described above in Example 2. The shear tests indicate that fluid $D_2$ behaves very comparably to fluid $P_2$ over a wide range of shear rates. Theoretically, this rheological behavior for $D_2$ is logical because the small globules of dispersed emulsion have the external appearance of pure oil droplets. Thus, the emulsion dispersion $D_2$ is quite similar physically to an oil-in-water in emulsion. The major advantage, however, afforded by fluid $D_2$ over fluid $P_2$ is that it has a considerably lower oil content and may be an effective substitute for oil-in-water emulsions in many well treatment applications.

OPERATIONAL EXAMPLE

A well treatment composition was prepared using standard field blending equipment. The composition was prepared from a saline water solution containing 2% KCl and an oil blend containing 90 weight % diesel oil and 10 weight % ENJ 3029 surfactant. The saline water and oil blend were piped from their respective holding tanks to the suction header of a first centrifugal pump which vigorously sheared the mixture to form a water-in-oil emulsion. The emulsion was fed from the centrifugal pump to a blender tub which provided additional mixing action by means of two horizontal, rotating intermeshing screws. The blender tub, in turn, fed into a second centrifugal pump which further sheared the emulsion.

During start-up operations two barrels of saline water and two barrels of oil blend were pumped into the blender tub to prime the centrifugal pumps. As the oil and water were mixed by the pumps and tub blender, additional amounts of water were gradually added to increase the volumetric ratio of water to oil. Initially, all of the blended oil and water was recirculated from the second centrifugal pump back into the blender tub, the rate of circulation through the closed system being maintained at five barrels per minute. As more water was added to the system, increasing the water-to-oil ratio, excess water begin to break out of the emulsion to form an external phase in which large globules of the water-in-oil emulsion were dispersed. The addition of excess water was ceased when the overall water to oil ratio reached 17:1. At this point, the emulsion dispersion was continuously withdrawn from the system at a rate of one barrel per minute. The remaining four barrels per minute exiting from the second centrifugal pump was recirculated into the tub blender. To maintain the system under steady state conditions saline water and diesel blend were fed into the first centrifugal pump at a total rate of one barrel per minute with the volumetric ratio of water-to-oil being maintained at the desired level of 17:1.

The well treatment composition produced by the above described field blending technique was extremely viscous, exhibiting an apparent viscosity of over 1000 centipoise at a shear rate of 100 reciprocal seconds. The composition nevertheless was readily pumpable since the excess water in the external phase provided sufficient lubrication to minimize friction pumping losses. To test the solids carrying capability of the composition, a commercial 20/40 mesh sand proppant was continuously added to the fluid during a repetition of the test described above. It was observed that some additional excess water was initially released into the external aqueous phase when the proppant was added. However, conditions quickly stabilized and the fluid composition was able to achieve a proppant concentration of 4 pounds of sand per gallon of fluid, indicating that the fluid composition was particularly well suited for hydraulic fracturing operations.

As mentioned previously, the method of the present invention can be used for most well treatment applications. The following examples describe the use of the compositions described above in well treatments referred to as "Hydraulic and Acid Fracturing", "Matrix Acidizing", "Flow Diversion", and "Contaminant Elimination".

HYDRAULIC FRACTURING

Because the well treatment compositions disclosed herein display similar physical properties to viscous emulsions, they can be substituted for such emulsions in hydraulic fracturing operations, especially where oil-in-water fracturing fluids are utilized. Such a substitution permits a significant reduction in the amount of oil used in the fracturing fluid and a consequent savings in the cost of the fluid. Additionally, as indicated in Example 1, the fluids used in the present invention also exhibit superior rheological properties.

For hydraulic fracturing operations, the well treatment composition described in the Example 1 would be highly suited for hydraulic fracturing operations. Preferably, the water-in-oil emulsion would comprise from about 50 to about 95 volume percent of the total fracturing fluid. The emulsion itself would normally contain from about 5 to about 30 volume percent of liquid hydrocarbon. For actual field operations, the method of the present invention can be employed with only slight modification to conventional fracturing techniques. Typically, lease crude oil or diesel oil would serve as the liquid hydrocarbon while water trucked to the well site or lease brine would serve as the aqueous component.

The oil and water would first be delivered to tanks positioned at the well site. If the total oil concentration is anticipated to be about 20% or less of the total volume of the fracturing fluid, one 500-barrel tank will normally be sufficient for containing the oil. For the present example, 180 barrels of diesel oil and approximately 20 barrels of a suitable surfactant such as ENJ 3029 would be sufficient. Water or lease brine would be stored at the site in five 500-barrel tanks. Water soluble components including water softeners, polymeric thickeners, friction reducers and other additives such as potassium chloride, are dissolved in two of the water tanks. The water in these tanks will subsequently serve as the external aqueous medium in which the water-in-oil emulsion is dispersed.

Blending operations are commenced by thoroughly mixing all of the oil with the 1900 barrels of water containing no additives to form water-in-oil emulsion. To achieve a stable, fine grained emulsion, intense agitation or turbulent blending may be necessary. Continuous turbulent blending techniques such as those discussed in U.S. Pat. No. 3,722,595 (O. M. Kiel) can be readily adapted to prepare a stable water-in-oil emulsion.

As the water-in-oil emulsion is formed, it can be mixed with the remaining 600 barrels of water (containing the additives) to form a stable dispersion to be used as the fracturing fluid. The overall oil concentration of this fluid would be about 7 volume percent. The fracturing fluid can then be pumped into the well to perform the fracturing operation.

An initial volume of the fracturing fluid, known as a pad, is injected into the well at a pressure sufficient to fracture the formation. The pad will generally contain a fluid loss control additive such as silica flour in a concentration of about 20 to 50 pounds per 1000 gallons of fracturing fluid. Following injection of the pad, the fracturing fluid containing suspended propping agent particles is injected into the fracture. Typically, silica sand, in concentrations of between about 3 and 10 pounds per gallon of fluid, is employed as the propping agent.

After the formation has been fractured and the propping agent emplaced in the fracture, the well is shut in for one to two days. The shut in period will permit the water-in-oil emulsion to break, causing the fracturing fluid to revert to a two-phase fluid of oil and water. The two phases, being much lower in viscosity, than the original fracturing fluid, are readily removed from the wellbore.

ACID FRACTURING

In an acid fracturing operation, the subterranean formation is fractured with an acid-carrying fluid. The conductivity of the formation is therefore enhanced by the formation being fractured and etched by the fracturing fluid. If an emulsion type fracturing fluid is employed, the acid is normally carried in the aqueous phase of the emulsion. For most treatments the aqueous phase contains from about 3% to 15% by weight of an acid which is usually hydrochloric or hydroflouric acid or a mixture of both. However, if the emulsion contains a major proportion of hydrocarbon phase, as is the case with most oil-in-water emulsions, then the amount of acid which can be delivered to the formation per volume of emulsion pumped is relatively small. For example, if the acid is in a concentration of 10% in the aqueous phase and the aqueous phase represents 40% by weight of the emulsion, then the overall weight percentage of acid in the emulsion is only 4%. Using the method of the present invention a much higher percentage of acid can be delivered into the formation because the aqueous component constitutes a much larger proportion of the fracturing fluid.

In conducting an acid fracturing operation using the present invention, acid can be carried in the external aqueous medium surrounding the suspended masses of emulsion or it can be carried in the inner aqueous phase of the emulsion or it can be carried in both aqueous components. If carried only in the emulsion water phase, the acid would be released slowly and continuously in the formation. This latter approach offers several advantages. First, with the acid bound in the water phase of the dispersed emulsion, wellbore tubulars would not be exposed to the acid as it is injected into the formation during a fracturing or matrix acidizing operation, thus preventing corrosion of the tubulars by the acid. Secondly, the acid would not be consumed in the area of the formation nearest the wellbore where well situation is normally least needed. Instead, the acid-bearing emulsion globules can penetrate deep into the formation where they will be most effective in achieving well stimulation. As the globules leak into the formation, they will not release acid until pore channels smaller than the droplets of the internal water phase are reached. Since the droplets are too large to enter the smallest fissures and channels, they will be stripped of their external coating of oil, thereby releasing the entrapped acid. Release of the acid at this point permits the small channels to be etched, causing significant increases in conductivity of those portions of the formation farthest away from the wellbore.

MATRIX ACIDIZING

In matrix acidizing, the acid-bearing fluid is slowly injected into the formation so that the acid can permeate into channels and fissures that have been clogged, damaged or constricted with clays or formation fines. The acid dissolves the fines, thereby inreasing permeability. In a matrix acidization of a sandstone or carbonate formation, the acid-bearing droplets would essentially be self-diverting and would only release acid in those pore channels in greatest need of acidization. In a matrix acidization, it may be preferable to employ a fluid similar to the one described in Example 2. The advantage of such a fluid is that its extremely small emulsion globules (20$\mu$) will be able to penetrate into the narrower pore channels of the formation before encountering a pore throat small enough to cause release of the acid from the internal aqueous phase. It would be necessary, however, to prepare a fluid comprising a more dilute dispersion of emulsion globules than that described in Example 2 so that the fluid would have a sufficiently low viscosity to permit injection into the formation at matrix rates. In such a matrix acidization treatment, the emulsion globules may comprise as little as 30 volume percent of the dispersion and the acid concentration of the acid aqueous phase may be as high as 40 percent.

FLOW DIVERSION

The internal aqueous phase of the suspended water-in-oil emulsion can also serve as a carrier liquid for fine particulate materials. In a flow diversion operation, particulate materials are injected into a zone of a formation to plug the zone. With a particular zone or zones plugged in this manner, well treatment fluids following the particulate materials will be diverted away from these zones and into other zones of the formation for which the treatment was intended. The particulate materials can later be removed from the plugged zones with a suitable solvent or by decomposition.

Encapuslation of the particulates in dispersed emulsion globules serves as a low-cost mechanism for continuous injection operations in which particulates and the treating fluid are simultaneously injected into the formation. The particulates, encapsulated in the aqueous phase of the emulsion, would be protected from the external aqueous medium by the external hydrocarbon phase of the emulsion. This is especially important if the particulates are reactive with the treating fluid in the aqueous medium. For example, if the external aqueous medium contains a reactive acid, normal operations would require injecting the particulates in an inert spacer fluid and following the spacer fluid with a batch injection of acid. In the present invention, however, the particulates are separated from the corrosive acid by the hydrocarbon phase of the emulsion globule and therefore can be injected into the formation simultaneously with the acid. Once in the formation, the eulsion globules would flow into the most porous zones of the formation, depositing the particulate materials and plugging the zone. The external aqueous medium, carrying the treating fluid, could then be diverted into the other formation zones.

CONTAMINANT ELIMINATION

Another useful property of the suspended emulsion globules is that their relatively small size presents a large total surface area. As a result of the larger surface area, the globules are efficient mass transfer agents. Naturally, the smaller the globule size the greater its mass transfer efficiency. Both organic and inorganic compounds can migrate into the aqueous phase of the globule by permeating the liquid hydrocarbon phase. The globules can, therefore, be used as scavengers for corrosive contaminants present in the wellbore or formation such as hydrogen sulfide. Carbonates of zinc or copper which are well-known chemical scavengers for hydrogen sulfide, can be dissolved in the aqueous phase of the globules. Hydrogen sulfide, present in the external aqueous medium, would migrate through the hydrocarbon phase into the aqueous phase and would react with the carbonate to form an insoluble precipitate which would return with the treating fluid. The scavenger emulsion globules can, for example, be dispersed in drilling muds or workover fluids. Once again, the use of very small emulsion globules such as those prepared in Example 2 would be highly suited as contaminant scavengers.

It should be apparent from the foregoing that the method of the present invention offers significant advantages over well treatment techniques previously known to the art. It will be appreciated that while the present invention has been primarily described with regard to the foregoing embodiments, it should be understood that several variations and modifications may be made in the embodiments described herein without departing from the broad inventive concept disclosed herein.

We claim:

1. In a method of treating a subterranean formation surrounding a well in which a treating composition is injected into said formation, the improvement wherein said treating composition comprises a water-in-oil emulsion dispersed in an aqueous medium, said water-in-oil emulsion having an internal aqueous phase and an external liquid hydrocarbon phase comprising a blend of a liquid hydrocarbon and an oil soluble surfactant.

2. The method of claim 1 wherein said water-in-oil emulsion contains from about 30 to about 90 volume percent of said treating composition.

3. The method of claim 1 wherein said water-in-oil emulsion comprises from about 60 to about 80 volume percent of said treating composition.

4. The method of claim 1 wherein said water-in-oil emulsion contains from about 3 to about 50 volume percent of said external liquid hydrocarbon phase.

5. The method of claim 1 wherein said water-in-oil emulsion comprises from about 5 to about 25 volume percent of said external liquid hydrocarbon phase.

6. The method of claim 1 wherein said hydrocarbon phase contains from about 0.5 to about 40 weight percent of a surfactant soluble in said hydrocarbon.

7. The method of claim 1 wherein said hydrocarbon phase contains from about 3 to about 25 weight percent of a surfactant soluble in said hydrocarbon.

8. The method of claim 6 wherein said internal aqueous phase comprises aqueous droplets having an average diameter of between about 0.01 and about 100 microns.

9. The method of claim 6 wherein said aqueous droplets having an average diameter of between about 0.1 and about 10 microns.

10. The method of claim 6 wherein said liquid hydrocarbon phase contains a liquid hydrocarbon selected from the group consisting of crude oil, diesel oil, gas oil, gasoline, kerosene, benzene, toluene, ethylbenzene, cyclohexane, hexane, decane, and hexadecane and mixtures thereof.

11. The method of claim 6 wherein said aqueous medium contains minor amounts of a viscosifier.

12. The method of claim 6 wherein said aqueous medium contains minor amounts of a water soluble surfactant.

13. In a method of treating a subterranean formation surrounding a well in which a treating composition is injected into said formation, the improvement wherein said treating composition comprises a dispersion of a water-in-oil emulsion in an aqueous medium, said emulsion comprising from about 30 to about 95 volume percent of said treating composition and further having an internal aqueous phase and an external oil phase, said external oil phase comprising from about 3 to about 50 volume percent of said emulsion and containing a liquid hydrocarbon and from about 0.5 to about 40 weight percent of a surfactant soluble in said hydrocarbon.

14. In a method of fracturing a subterranean formation surrounding a wellbore wherein a fracturing fluid is injected into said formation at a pressure sufficient to fracture said formation, the improvement wherein said fracturing fluid comprises a dispersion of a water-in-oil emulsion in an aqueous medium, said emulsion having an internal aqueous phase and an external liquid hydrocarbon phase comprising a blend of a liquid hydrocarbon and an oil soluble surfactant.

15. The method of claim 1 wherein said water-in-oil emulsion comprises from about 50 to about 90 volume percent of said fracturing fluid.

16. The method of claim 1 wherein said water-in-oil emulsion contains from about 5 to about 30 volume percent of said liquid hydrocarbon phase.

17. The method of claim 14 wherein said hydrocarbon phase contains from about 5 to about 25 weight percent of a surfactant soluble in said hydrocarbon.

18. The method of claim 17 wherein said internal aqueous phase comprises aqueous droplets having an average diameter of between about 0.1 and about 10 microns.

19. The method of claim 17 wherein said aqueous medium contains an acid.

20. The method of claim 17 wherein said aqueous medium contains minor amounts of a viscosifier.

21. In a method of acidizing a subterranean formation wherein an acidizing fluid is injected into and etches a formation, the improvement wherein said acidizing fluid comprises a dispersion of a water-in-oil emulsion in an aqueous medium, said emulsion having an acidified internal aqueous phase and an external liquid hydrocarbon phase comprising a blend of a liquid hydrocarbon and from about 0.5 to about 40 weight percent of an oil soluble surfactant.

22. The method of claim 21 wherein said aqueous phase contains from about 3 to 40 weight percent of an acid capable of etching said formation.

23. In a method of diverting flow from a zone of a subterranean formation wherein particulate matter is injected into said zone to plug it, the improvement comprising:
(a) encapsulating said particulate matter in a water-in-oil emulsion, said emulsion having an internal aqueous phase containing the particulate matter and an external liquid hydrocarbon phase comprising a blend of a liquid hydrocarbon and from about 0.5 to about 40 weight percent of an oil soluble surfactant;
(b) dispersing said emulsion in an aqueous fluid; and
(c) injecting said aqueous fluid into said zone to deposit said emulsion in said zone, said emulsion thereafter breaking and releasing said particulate matter into said zone.

24. The method of claim 23 wherein said aqueous fluid is a treating fluid which is diverted into other zones in said subterranean formation.

25. A well treatment method comprising injecting into said well a composition comprising a dispersion of a water-in-oil emulsion in an aqueous medium, said emulsion having an internal aqueous phase containing a reactive treating substance selected from the group consisting of carbonates of zinc and carbonates of copper and an external liquid hydrocarbon phase comprising a blend of a liquid hydrocarbon and from about 0.5 to about 40 weight percent of an oil soluble surfactant, said hydrocarbon phase being sufficiently permeable to permit the migration of hydrogen sulfide through said hydrocarbon phase and into said aqueous phase whereupon said hydrogen sulfide reacts with said treating substance.

26. A method of treating a subterranean formation surrounding a well comprising:
   (a) blending a liquid hydrocarbon with from about 0.5 to about 40 weight percent of a surfactant soluble in said hydrocarbon to form a hydrocarbon-surfactant blend;
   (b) mixing the hydrocarbon-surfactant blend with an aqueous liquid to form a stable water-in-oil emulsion;
   (c) mixing said emulsion in an aqueous medium to form a dispersion of said emulsion in said aqueous medium; and
   (d) injecting said dispersion into said well to treat said formation.

27. The method of claim 26 wherein said water-in-oil emulsion comprises from about 30 to about 95 volume percent of said dispersion.

28. The method of claim 26 wherein said water-in-oil emulsion contains from about 3 to about 50 volume percent of said hydrocarbon-surfactant blend.

29. The method of claim 26 wherein said dispersion is injected into said well at a rate and pressure sufficient to hydraulically fracture said formation.

30. A method of treating a subterranean formation surrounding a well comprising:
   (a) blending a liquid hydrocarbon with from about 0.5 to about 40 weight percent of a surfactant soluble in said hydrocarbon to form a hydrocarbon-surfactant blend;
   (b) forming a stable oil-in-water emulsion by mixing an aqueous liquid with said hydrocarbon-surfactant blend;
   (c) adding additional quantities of said aqueous liquid while continuing the mixing of said emulsion until a dispersion of the oil-in-water emulsion in the aqueous liquid is formed; and
   (d) injecting said dispersion into said well to treat said formation.

31. The method of claim 30 wherein said water-in-oil emulsion comprises from about 30 to about 95 volume percent of said dispersion.

32. The method of claim 30 wherein said water-in-oil emulsion contains from about 3 to about 50 volume percent of said hydrocarbon-surfactant blend.

33. The method of claim 30 wherein said dispersion is injected into said well at a rate and pressure sufficient to hydraulically fracture said formation.

34. The method of claim 33 wherein a proppant is added to said dispersion prior to the injection of said dispersion into the well.

* * * * *